3,783,139
PROCESS FOR SEPARATING CONSTITUENTS OF GRAIN FLOUR AND PRODUCTS PRODUCED THEREBY
John R. Moneymaker, Overland Park, Kans., and Curtis J. Forsythe, Raytown, Mo., assignors to Top-Scor Products, Inc., Kansas City, Kans.
No Drawing. Filed July 29, 1971, Ser. No. 167,474
Int. Cl. A23j *1/12;* C08h *1/00;* C13l *1/00*
U.S. Cl. 260—112 G     31 Claims

ABSTRACT OF THE DISCLOSURE

Process for separating grain flour into starch and protein fractions involving preparing a dough from the flour and water in the presence of certain nonionic surfactants and washing the dough with additional water under manipulation.

---

This invention relates to the separation of grain flour into its major constituents, i.e., protein and starch, by water treatment and, more particularly, to improvements in such treatment and the products produced thereby.

Grain flour, and particularly wheat flour, traditionally has been separated into its gluten (primarily protein) and starch constituents by first preparing a dough mass with makeup water and thereafter washing out most of the starch by manipulating the dough mass in the presence of additional water. This process has been reasonably successful so long as the flour is "hard," that is, possesses good washing characteristics. However, when the same separation process is attempted with "soft" flours, the yields of recovered gluten tend to be poor or the separation substantially fails because the gluten will not develop sufficiently to form a coherent mass. Characteristically, with soft flours the gluten tends to break up and, more or less, sluice away with the starch, producing starch slurries seriously contaminated with protein.

Another major disadvantage associated with traditional methods of starch-gluten separation is the large volume of wash water required for adequate starch removal, that is, to obtain a gluten isolate containing seventy-five percent to eighty percent protein on a moisture-free basis. In general practice, the starch slurry obtained is on the order of 40° Bé, containing only about 7.5 grams of solids per 100 cc. of slurry. This results in a large volume of effluent which must be disposed of after the starch has been recovered. Present pollution abatement requirements specify that such large volume effluents may no longer merely be sewered, thus requiring considerable expense for concentrating and disposing of the unwanted solids.

Further, with regard to wheat flours, it has been shown that for superior baking performance, the isolated gluten fraction must retain a portion of the water soluble proteins and pentosans originally present. Another consequence, therefore, of the high volume wash water required by traditional methods is the removal and loss of a good deal of these water soluble fractions with a subsequent reduction in the optimum baking characteristics of the dried gluten isolate.

The principal objects of the present invention are: to provide an improved process for separating the constituents of grain flour by water treatment; to provide an improved process for separating gluten from the starchy components of wheat flour; to provide such a process which produces superior gluten yields whether employing high-protein hard wheat flours or low-protein soft wheat flours; to provide such a process which requires substantially less total process water compared to traditional methods; to provide a chemically modified gluten possessing advantageous properties over gluten recovered by traditional methods; to provide a process for the more efficient recovery of starch from grain flours; to provide an improved method for the recovery of starch having extremely low protein contaminates; and to provide a grain flour separating process which is generally more efficient than traditional methods, highly versatile in use and well suited for its intended purpose.

Other objects and advantages of this invention will become apparent from the following description wherein are set forth by way of example certain embodiments of this invention.

In accordance with this invention, it has been discovered that the protein constituents of grain flour, and particularly the gluten of wheat flour can be chemically modified to exhibit unique extraction characteristics by employing certain compounds which may be considered derivatives of the polyethylene and polypropylene glycols. More specifically, the agents which are operational for this purpose are all nonionic surfactants having in common the general formula:

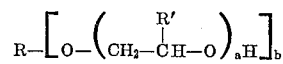

wherein R, R', a and b have one of the following relationships:

(I) R is a fatty acid radical having from about 12 to about 24 carbon atoms, and R' is selected from the group consisting of H and $CH_3$, and a is an integer from about 8 to about 40 and b is 1;

(II) R is a polyoxypropylene group having a molecular weight of at least 900, and R' is H, and a is an average integer, and b is equal to 2, and the product of a times b is such that the oxyethylene content represents from about 10% to about 80% by weight of the molecule, and the ratio of the weight percent of oxyethylene in the molecule to the molecular weight of the polyoxypropylene nucleus is less than about 0.0316;

(III) R is polypropylene glycol having a molecular weight of at least about 900, and b is zero;

(IV) R is a partial fatty acid ester of a polyhydroxy compound wherein the fatty acid radical contains from about 12 to about 24 carbon atoms, and R' is selected from the group consisting of H and $CH_3$, and a is the average number of oxyalkene residues per chain, and b equals the average number of chains in the molecule, such that the product of a times b represents on the average an oxyalkene content of from about 8 to about 25 residues per molecule.

The partial fatty acid ester of a polyhydroxy compound, by way of specific example, may be a mono fatty acid ester of propylene glycol, a mono or di fatty acid ester of glycerin, mixed mono-di fatty acid esters of glycerin, mono, di or tri fatty acid esters of sorbitol, or mixed mono-di-tri fatty acid esters of sorbitol.

The agents are used at levels from about 0.25% to about 4.0%, based upon flour weight, the levels employed depending primarily upon the type of flour selected. The practice of the invention can be achieved either by treating the flour with the desired agent before hydration of the flour or by dispersing the agent directly into the dough make-up water, the latter being the preferred method. The usual levels of make-up water are from about 120% to about 170% based upon flour weight, the specific absorption being determined primarily by the type of flour selected. The usual absorption with a normal, medium to medium high protein flour for dough make up is around 150%.

When the flour is treated with one or more of the above agents in the manner prescribed, the flour proteins, as gluten, present in the thin batter which initially results are chemically modified so that with mechanical agitation the gluten components come together into a sinewy, coherent mass which is often capable of "picking up" and cleaning the sides of the development bowl, even at absorptions as high as 170%.

To the developed mass, a volume of additional water, hereafter referred to as "separation water," is added in an amount approximately equal to the volume of the make-up water and the whole mass is slowly agitated or manipulated to effect the separation of the gluten cleanly from the starch slurry. At this point the gluten is a coherent mass having an extremely open and net-like structure containing approximately 65% to 75% protein on a moisture free basis. Because of the open, net-like structure of the isolated modified gluten mass, greater access to the structure is permitted for ingress and regress of the wash water. Two to three rinsings with a fresh water spray are usually sufficient to complete the separation of the gluten constituents from the starchy components of the flour, whereupon there remains a very high percentage of the flour proteins extracted as a gluten mass.

It has been found that the modified gluten extracts obtained contain from about 80% to about 85% protein on a dry basis, representing from about 95% to about 100% of the insoluble proteins originally present. Further, these gluten extracts can be obtained from either low protein soft wheat flours or high protein hard wheat flours while the total process water employed (make-up water together with separation water and rinse water) approximates 0.54 gallon per pound of flour processed. The starch slurry produced contains approximately 15 grams of solid per 100 cc. of slurry and has a density of about 8° Bé. This may be compared to starch slurries containing about 7.5 grams of solids per 100 cc. and a density of about 4° Bé. obtained by using traditional methods requiring approximately 1.1 gallons of water per pound of flour processed.

The wet, modified gluten extracts obtained by practicing this invention may be dried by any one of several known methods presently employed in starch-gluten factories. Likewise, the starch slurry obtained by the practice of this invention may be treated by the usual methods of conventional starch-gluten factories to recover the starchy constituents as prime and secondary starch. The treatment of the effluent may also be handled conventionally, however, since it originates in a form approximately twice as concentrated as the effluent obtained by traditional methods, it may be processed for disposal at considerable savings.

Still further advantages which may be obtained by the practice of this invention is the production of starch slurries containing considerably less protein contamination and none of the mineral salts which are commonly added to toughen the gluten for the purposes of improving cohesion and reducing gluten break-up during washing. The latter permits the use of less water during starch slurry processing and starch purification thereby again reducing the total volume of effluent produced for treatment while at the same time rendering the low salt effluent solubles more suitable for potential applications and markets.

The effectiveness of this invention was, in part, demonstrated by the determination that gluten development and cohesion could not be obtained in a high absorption range without the presence of the activating agents. This remained true even under an extended mixing time as long as two hours, the undeveloped mass resembling a smooth batter having little, if any, cohesive properties.

Investigation further indicated that the practice of this invention is specific to the agents described, other common edible surface active additives used as agents being generally ineffective for this purpose. Thus, calcium or sodium stearyl-2-lactylate, hydrated mono-diglycerides, hydrated lactylic stearate, hydrated succinylated monoglyceride, sodium stearyl fumarate, or fatty acid esters of sorbital have been found ineffective to obtain the desired gluten modification.

Although the preferred mode of incorporation of the described agents is by prior dispersion in the make-up water and adding the make-up water to the flour while mixing, addition of the flour to the make-up water containing the agent functions nearly as well. The desired results also can be obtained by dry dispersion of an agent of this invention on the flour, followed by either the addition of the treated flour to the make-up water or the addition of the make-up water to the treated flour, however, development times are considerably longer and the gluten isolate tends to be of poorer yield and lower protein concentration.

It is noted that if the flour is hydrated by addition of make-up water in the absence of an agent or agents of this invention, subsequent addition thereof to the system will not produce the desired results, the reactive sites on the flour proteins apparently being blocked by the water of hydration.

As with conventional starch-gluten processes, the control of temperature to effect optimum results with a given flour and under particular absorption and mixing times is an important factor. It has been found that once the optimum levels of additive, make-up water and mixing time have been established for a given flour, the control of temperature within reasonable limits is important to achieve the maximum yields of gluten. Generally the temperature required to effect the most desirable results appear to range from about 30° C. to about 45° C. for make-up water and during development of the gluten. At high temperatures reduced yield occurs. At lower temperatures, the required development time becomes progressively longer, requiring approximately two to three times as long at 20° C.

For a given wheat flour with all other variables remaining constant, the development time decreases with increased level of agent up to about 4%, based upon flour weight. Further, the protein content in the gluten isolate, on a moisture free basis, increases with increasing levels of agent up to about 4% of the agent based upon flour weight. Also, in general, the higher the insoluble protein content of a given flour, the lower the level of agent needed to accomplish the optimum results, as little as 0.25% of the agent based upon flour weight being required for a hard spring wheat clear flour. Conversely, for a low protein soft wheat flour, from which it is virtually impossible to separate the gluten from the starchy constituents by conventional methods, as high as 4% of an agent of this invention may be required to obtain the desired results.

Nevertheless, in general, the recovery of insoluble flour proteins, as gluten, from the starchy constituents of low protein soft wheat flours, by the practice of this invention at the optimum level of agent use, is nearly comparable to the recoveries obtained from medium high protein wheat flours in conjunction with optimum agent levels. In some cases, the recoveries from low protein soft wheat flours actually surpasses the recoveries obtained from medium high protein flours with conventional wash processes.

This invention may be easily incorporated with the traditional methods of starch-gluten extraction from flour, these traditional methods normally being termed the "standard dough process" and "standard batter process." As described in detail below, the incorporation of one or more of the agents into either the flour or make-up water is a relatively simple procedure.

In practice, it has been found that the modified gluten isolates obtained from wheat flour exhibit more cohesiveness, softness and elastiicty than do the isolates obtained from the same flours by the traditional methods. Also, the modified gluten isolates produced in accordance with this invention have been found to display greatly increased water retention and greater extensibility while at the same time being more tenacious than the unmodified gluten isolates. As further discussed hereinafter, evidence of actual chemical modification of the gluten is evidenced by the apparent chemical bonding of approximately 1% by weight, on a moisture free basis, of the agent to the proteins of the gluten isolate.

The following examples will serve to illustrate the practice of this invention:

EXAMPLE I (A) Twelve grams, 2% based upon flour weight, of E.M.G.–20, Breddo Food Products Corporation's brand of polyoxyethylene (20) monodiglyceride, lot #0260, conforming to U.S. Federal Food Additive Order 21 CFR 121.1221, was dissolved in 900 grams, 150% based upon flour weight, of tap water at 35° C. Into a four-quart K5–A Hobart mixing bowl which had been modified by installing a ¼-inch outlet nipple at the bottom of the bowl for the purpose of starch slurry draining, was added 600 grams of a Kansas patent wheat flour which when analyzed by accepted methods was found to have on an as is basis a total protein of 11.30%, comprised of 9.80% insoluble proteins and 1.50% soluble proteins, 12.0% moisture, 0.406% ash, and an optimum farinograph mixing time and absorption of 9.0 minutes and 67.0% respectively.

At #2 mixing speed, using a Model K5–A Hobart mixer equipped with the K5–A–B beater, was then slowly added the 900 grams of makeup water containing the dissolved ethoxylated mono-diglycerides. After hydration of the flour was complete, the thin batter which initially resulted was mixed at #10 speed at 35° C. for approximately ten minutes until a sinewy coherent mass developed which picked up and cleared the sides of the mixing bowl. At #2 speed was then added an additional 900 ml. of tap water at 35° C. and the low speed agitation continued until the gluten had completely separated from the starch slurry as a stringy coherent mass having an extremely open and net-like structure. The starch slurry was then drained from the bowl and the crude gluten mass rinsed under a tap water spray with continuous #2 speed agitation until an additional 900 ml. of rinse water was collected. The total volume of process water used was 2700 ml. for 600 grams of flour. This is equivalent to 0.54 gallon per pound of flour. A 100 ml. aliquot of total starch slurry was found to have a density of approximately 1.06, corresponding to approximately 8° Bé., with a dry solids content of 15.5 grams. The resulting gluten isolate was oven dried at 130° C. to constant weight and found to weigh 69.1 grams with a protein content of 86.7%. This corresponds to 88.4% recovery of gluten based upon total flour proteins, and to 100.9% recovery based upon insoluble flour proteins.

(B) A control, i.e., unmodified gluten sample was prepared and isolated from 600 grams of the same flour by a traditional dough process as follows:

Using the modified four-quart Hobart mixing bowl, the flour and 390 grams (65% absorption) of tap water at a temperature of 25° C. were mixed at #3 speed for approximately three minutes until the flour was completely hydrated and the dough became a coherent mass. The resulting dough was then given a ½ hour rest period to allow the gluten to fully hydrate and toughen, after which it was washed with gentle agitation under an intermittent tap water spray at a temperature of 25° C. Between each spraying the resulting starch slurry was allowed to drain from the bowl until the total volume of wash water used totaled approximately 5,000 ml. The total volume of process water used was, therefore, approximately 5,400 ml., corresponding to 1.1 gallons of water per pound of flour processed. The resulting starch slurry was found to have a density corresponding to approximately 4° Bé. and to contain about 7 grams of solids per 100 cc. The isolated gluten was oven dried at 130° C. to constant weight and found to weigh 66.5 grams. Subsequent analysis indicated the dry product contained 81.5% protein. This corresponds to 79.9% recovery of gluten based upon total flour proteins and 92.2% recovery, based upon insoluble flour proteins, compared to 88.4% and 100.9% respectively for the example of this invention described in I(A).

The above data is clearly indicative that we have obtained by the employment of our process, as opposed to the standard dough process, utilizing only about one-half as much process water, a modified gluten extract which, on a relative basis, represents an improvement of 4% in total weight yield, a 6.4% improvement in total protein content and nearly a 9% improvement in the recovery of both insoluble flour proteins and total flour proteins.

(C) The procedure followed in Example I(A) was repeated, this time without the use of an agent of this invention. A thin homogenous batter resulted which did not develop even after extended mixing.

Example I demonstrated not only that the presence of an agent of this invention is necessary to obtain the development of the dough under the stated conditions but also that the practice of the invention, as opposed to the described traditional process permits the utilization of only about one-half as much process water while producing a gluten extract which, on a relative basis, represents an improvement of 4% in total weight yield, 6.4% improvement in total protein content and nearly an 11% improvement in the recovery of both insoluble flour proteins and total flour proteins.

EXAMPLE II

Following the general method of Example I(A), 800 grams (133% based upon flour weight) of 35° C. tap water was added to 600 grams of the same flour used in Example I. After two minutes at low speed mixing to fully hydrate the flour, an additional 100 grams (17% based upon flour weight) of 35° C. tap water containing in solution 12 grams (2% based upon flour weight) of the agent employed in Example I(A) was slowly added over a period of one minute. The resulting thin batter was then mixed at #10 speed for approximately one hour, after which time it was somewhat thicker but still completely smooth and homogenous. It was then concluded that the desired development necessary to accomplish the objective of this invention would not occur within a commercially practical time.

Example II demonstrated that the full hydration of the flour before introducing an agent of this invention tends to inhibit or prevent the desired results by interfering with development.

EXAMPLE III

The process of Example I(A) was repeated in duplicate fashion, and 249 grams of wet gluten were obtained. The wet gluten was of a very light color and exhibited a high degree of flexibility, elasticity and softness, while at the same time being extremely cohesive and tenacious.

The wet gluten was freeze dried, yielding a white fluffy product weighing 74.5 grams, containing 7.9% residual moisture. The weight of product obtained on a moisture free basis was, therefore, 68.6 grams. Thus, the original wet gluten isolate contained essentially 180 grams of water or approximately 72% by weight of the wet gluten isolate. Analysis of the freeze dried product indicated it to be 87.0% protein on a moisture free basis. The freeze dried gluten isolate was then ground to a powder of between 60 and 70 mesh with a Mikro-Pulverizer and found to have a bulk density of 0.30 gram per cubic centimeter.

A portion of the ground modified gluten was rehydrated and extensively washed to remove any residual unbound ethoxylated mono-diglyceride. The washed sample was then oven dried at 130° C., reground and subjected to acid digestion. The digestion products were centrifuged and the supernatant analyzed for ethoxylated glycerine.

The results of this analysis indicated that based upon the weight of ethoxylated glycerine recovered from the supernatant, the original modified freeze dried gluten contained approximately one percent by weight of chemically bound ethoxylated mono-diglycerides on a moisture free basis.

(B) The control process of Example I(B) was repeated in duplicate fashion, and 197 grams of wet gluten were obtained. The wet gluten was quite yellow in color, being quite balky and exhibiting only a limited degree of elasticity, cohesiveness, and tenacity. The wet gluten was freeze dried, yielding a product consisting of hard grayish-yellow lumps weighing a total of 72.3 grams, containing 7.3% residual moisture. The weight of the product on a moisture free basis was, therefore, 67 grams. Thus, the original wet gluten isolate contained 130 grams of water or approximately 66% by weight of the wet gluten isolate. The unmodified freeze dried gluten was then ground to a powder of between 60 and 70 mesh with a Mikro-Pulverizer and found to have a bulk density of 0.44 gram per cubic centimeter and a protein content of 80.9% on a moisture free basis.

A comparison between the products of Example III(A) and Example III(B) demonstrates that the modified product is uniquely different in its qualitative rheological properties than the unmodified product. Further, there is clear evidence that a true chemical modification of the gluten occurred, in that approximately one percent by weight of the product of Example III(A) was analyzed to be tightly bound ethoxylated mono-diglycerides.

(C) 20 grams of the freeze dried product of Example III(A) was introduced into 100 grams of a 5% sodium hydroxide solution at a temperature of 140° F. A clear, pale yellow dispersion resulted. Repeating the above using instead the normal wheat gluten isolate of Example III(B) produced an undispersable rubbery mass.

Example III(C) represents further evidence of a chemical modification of the gluten produced by the practice of this invention.

EXAMPLE IV (A) The process of Example I(A) was repeated in duplicate fashion using a hard winter wheat clear flour having the following characteristics on an as is basis: a total protein content of 13.7%, comprised of 11.5% insoluble protein and 2.2% soluble protein; 11.0% moisture, 1.029% ash, and having an optimum farinograph absorption and mixing time of 69.8% and 4.8 minutes respectively.

A fifteen minute development time was required for this flour, and 295.5 grams of wet gluten isolate was obtained having the same general physical characteristics as the wet gluten isolate of Example III(A). The wet gluten isolate was oven dried at 130° C. to constant weight yielding 83.1 grams of dry product containing 81.5% protein representing a recovery of 98.1% based upon the insoluble flour proteins.

(B) The control process of Example I(B) was repeated in duplicate fashion using 600 grams of the clear flour characterized above. A total of 260.6 grams of wet gluten isolate was obtained possessing the same general characteristics as the wet control gluten isolate from Example III(B). The wet gluten isolate was oven dried at 130° C. to constant weight yielding 86.0 grams of dry product containing 77.2% protein representing a recovery of 96.2% based upon insoluble flour proteins.

Example IV indicates that while the gross weight of dry unmodified gluten isolate is greater than that of the dry modified gluten isolate, it is considerably less pure and represents a poorer net recovery of the flour proteins, as gluten. As demonstrated in other examples, the greater recovery of flour proteins, as gluten, was obtained while utilizing only about one-half as much process water (Example IV(A)) as was required by the standard dough process (Example IV(B)).

EXAMPLE V

Using the process of Example I(A), and the same clear flour used in Example IV, a level series of ethoxylated mono-diglyceride (E.M.G.-20) was evaluated to determine the effect of additive level upon the protein content of the dried gluten isolate. For the control, or zero percent E.M.G.-20, the process of Example I(B) was repeated with the exception that the total process water used was held to a total of 2700 ml. as per Example I(A). The results obtained are summarized in the following table along with the percentage of flour protein recovered as gluten, based upon the insoluble flour proteins.

TABLE I.—THE EFFECT OF E.M.G.-20 LEVEL UPON THE PROTEIN CONTENT OF DRY MODIFIED GLUTEN ISOLATES

| E.M.G.-20 level (percent) | Dry isolate (gm.) | Protein content (percent) | Recovery (percent) |
|---|---|---|---|
| 0 | 114.2 | 56.6 | 93.6 |
| 0.5 | 99.7 | 64.3 | 93.7 |
| 1.0 | 89.6 | 73.1 | 95.7 |
| 2.0 | 82.5 | 82.0 | 98.0 |
| 4.0 | 79.4 | 83.0 | 95.5 |

Example V indicated that, as the level of E.M.G.-20 increases, the gross weight of dry gluten isolate decreased, however, the protein content of the crude isolate as well as the net recovery of the flour proteins was seen to increase with increasing levels, up to 2% E.M.G.-20. At an E.M.G.-20 level of 4%, the protein content of the crude isolate was the greatest, however, the net recovery of the flour proteins decreased, thus indicating the optimum level was approximately 2% for this type of flour.

EXAMPLE VI

The experiments of Example V were repeated for the 1%, 2%, and 4% levels of E.M.G.-20. However, this time the crude gluten isolates which separated upon the addition of the 900 ml. of separation water were not given any additional washings with fresh water. Instead, in each case, after the initial separation was complete, the crude gluten isolates were taken on an as is basis, oven dried to constant weight and analyzed for protein content. In this example, therefore, the total volume of process water used in each case was only 1800 ml., or only about 0.36 gallon of water per pound of flour processed. The resulting starch slurries, therefore, contained approximately 24 grams of solids per hundred cubic centimeters, being on the order of 12.5° Bé.

TABLE II.—THE EFFECT OF E.M.G. LEVEL UPON THE PROTEIN CONTENT OF UNWASHED DRY GLUTEN ISOLATES

| E.M.G.-20 level (percent) | Dry isolate (gm.) | Protein content (percent) | Recovery (percent) |
|---|---|---|---|
| 1 | 99.7 | 66.4 | 96.0 |
| 2 | 91.7 | 74.1 | 98.5 |
| 4 | 89.6 | 74.7 | 97.0 |

Examples VI demonstrated that with unwashed crude gluten isolates, as with the washed crude gluten isolates of Example V, the protein content as well as the net recovery of flour proteins increased with increasing levels up to 2% E.M.G.-20. Also, at 4% E.M.G.-20, while there was small increases in the protein content of the crude isolate, there was a corresponding decrease in the net recovery of flour proteins. Table II indicated that, as the level of E.M.G.-20 was increased, the initial separation of the crude, modified gluten was more efficient and clean cut. Table II further indicated that a modified gluten product containing approximately 75% protein on a moisture free basis was obtained by the practice of this invention employing little or no additional washing of the initial gluten isolate. Thus, only about 0.36 gallon of process water per pound of flour was required, or only about one-third as much water as was required for the standard dough process of Example IV(B).

EXAMPLE VII

Following the procedure of Example IV(A), a make up water level series was conducted keeping the level of E.M.G.–20 constant at 2%. The amount of wash water used in each case was such that the total process water used was constant at 2700 ml. The data and results obtained from this study appear in Table III. As usuall, all levels of make up water (absorption) are based upon flour weight and all gluten weights are on a moisture free basis while the percentages of protein recovery are based upon insoluble flour proteins.

TABLE III.—THE EFFECT OF MAKE-UP WATER LEVEL UPON THE PROTEIN CONTENT OF DRY GLUTEN ISOLATES

| Make-up water | | Develop- | Dry gluten | Protein content | Protein recovery |
|---|---|---|---|---|---|
| Grams | Percent | ment | isolate (gm.) | (percent) | (percent) |
| 720 | 120 | 5 | 87.3 | 75.6 | 95.6 |
| 780 | 130 | 7 | 84.7 | 78.8 | 96.7 |
| 840 | 140 | 10 | 83.8 | 80.5 | 97.8 |
| 900 | 150 | 15 | 83.1 | 81.5 | 98.1 |
| 960 | 160 | 35 | 74.0 | 86.4 | 92.7 |
| 1,020 | 170 | (¹) | | | |

¹ Did not develop.

Example VII demonstrated that, as the level of make-up water was increased, all else remaining constant, the protein content of the dry gluten isolates as well as the recovery of the flour protein increase up to the optimum level which was 150% for this type of flour. Above 150% and up to 160% absorption, the development times increased, and while the relative protein content continued to increase, the net recovery of flour proteins diminished rapidly, until somewhere between 160% and 170% absorption, gluten development failed to occur. It is noted, however, that the maximum absorption appears to depend to a large degree upon the type of flour used, the particular agent employed and the level at which it is used, Example VII being limited to 2%.

EXAMPLE VIII

The process of Example IV(A) was repeated in duplicate fashion with the exception that the amount of fresh water rinse was increased, such that the total volume of process water used was approximtely 5,000 ml., the same as the standard dough process of Example IV(B). The product of this example was oven dried to constant weight and found to weigh 75.7 grams with a protein content of 89.6%, representting 97.7% of the insoluble flour proteins.

Example VIII illustrated that a nearly 90% (compared to 77.2%) wheat gluten isolate was obtained by an application of this invention when the amount of process water employed was equivalent to that employed in the standard dough process of Example IV(B), with essentially the same net recovery of insoluble flour proteins.

EXAMPLE IX

The control proces of Example IV(B) was repeated in duplicate fashion, with the exception that 2%, based upon flour weight, of Starfol D, Ashland Chemical Company's brand of polyoxyethylene (20) mono-diglyceride, Lot #SR 50296, conforming to the federal specifications as per Example I(A), was predissolved in the make up water. The resulting wet gluten isolate was observed to have all of the modified physical properties previously described and noted for the modified product of Example IV(A), and appeared to be identical in all respects. The product of this example was then oven dried to constant weight at 130° C. and found to weigh 73.0 grams with a protein content of 86.9%, representing 96% recovery of the insoluble flour proteins.

Comparing the results of Example IX to those obtained in control Example IV(B), it was apparent that the incorporation of the agent into the make-up water in the otherwise standard dough process produced a dramatic increase in the relative protein content of the dry gluten isolate while the net recovery of insoluble flour proteins remained essentially constant.

EXAMPLE X

In this example, comparisons were made between agents of this invention and known dough improving agents and other related compounds regarding the respective ability to produce the necessary modification of wheat gluten. In general, the procedure employed was to first dissolve or disperse 12 grams, 2% based upon flour weight, of the particular agent in 900 grams, 150% based upon flour weight, of water. The water containing the particular agent was then placed into a jacketed McDuffy mixing bowl connected to a circulating constant temperature bath thermostated at 35° C. At #1 mixing speed, using a Model A–120 Hobart Mixer equipped with a dough fork, was then added 600 grams of the clear flour characterized in Example IV. After hydration of the flour was complete, the thin batter initially resulting was developed at #3 mixing speed until optimum development occurred. The point of optimum development was taken to be the point of peak resistance to mixing and was determined by a recording ammeter installed in the mixer circuit. Thus, the point in time where peak amperage was required for mixing was taken as the peak resistance to mixing. The time required to reach this peak was then taken as a measure of the efficiency of the particular agent to produce the desired response. The results are displayed in Table IV.

Great care was taken to prehydrate or water jell those agents having low solubilities and/or dispersibilities in a flour-water system at 35° C. to insure that this did not account for a lack of response.

TABLE IV.—THE GLUTEN MODIFYING ABILITY OF VARIOUS AGENTS

| Additive | Level, percent | Development Time (min.) |
|---|---|---|
| Polyoxyethylene (20) sorbitan mono-oleate, Atlas Chemical Co. Inc., "Tween 80" lot #1203 | 2.0 | 20.0. |
| Polyoxyethylene (20) sorbitan tristearate, Atlas Chemical Co. Inc., "Tween 65" lot #1420 | 2.0 | 20.0. |
| Polyoxyethylene (8) monostearate, Atlas Chemical Co. Inc., "Myrj 45" lot #1364 | 2.0 | 21.0. |
| Polyoxyethylene (40) monostearate, Atlas Chemical Co. Inc., "Myrj 52" lot #242 | 2.0 | 21.0. |
| Polyoxyethylene (20) sorbitan monostearate, Atlas Chemical Co. Inc., "Tween 60" lot #894 | 2.0 | 28.0. |
| Polyoxyethylene (20) sorbitan monolaurate, Atlas Chemical Co. Inc., "Tween 20" lot #1420 | 2.0 | 28.0. |
| Polyoxyethylene (20) mono-diglyceride, Ashland Chemical Co., "Starfol D" lot #SR5096 | 1.0 / 2.0 / 4.0 | 30.5. / 25.5. / 24.0. |
| Polyoxyethylene (4) sorbitan monostearate, Atlas Chemical Co. Inc., "Tween 61" lot #4522C | 2.0 | 51.0. |
| Polyoxyethylene (5) sorbitan mono-oleate, Atlas Chemical Co. Inc., "Tween 81" lot #503 | 2.0 | Did not develop. |
| Polyoxyethylene (4) sorbitan monolaurate, Atlas Chemical Co. Inc., "Tween 21" lot #114 | 2.0 | Do. |
| Calcium stearyl-2-lactylate, C. J. Patterson Co., "VERV-Ca" lot #7B152 | 2.0 | Do. |
| Sodium stearyl-2-lactylate, C. J. Patterson Co., "Emplex" | 2.0 | Do. |
| Lactylic stearate, Durkee Chemical Co., lot #2VVA-2 | 2.0 | Do. |
| Sodium stearyl fumarate, Chas. Pfizer & Co. Inc., "PRUV" lot #G62476-8005 | 2.0 | Do. |
| Distilled monoglyceride, D.P.I. "Myverol" Type 18-07, lot #S-219 | 2.0 | Do. |
| Succinalated monoglyceride, National Dairy Products Corp., "S.M.G." | 2.0 | Do. |
| Sorbitan monostearate, Atlas Chemical Co. Inc. "Span 60" lot #777C | 2.0 | Do. |
| Polyethylene glycol, Union Carbide Corp., "Carbowax 20 M" lot #879 | 2.0 | Do. |
| Polyethylene glycol, Union Carbide Corp., "Carbowax 6000" lot #502 | 2.0 | Do. |
| Polyethylene glycol, Union Carbide Corp., "Carbowax 4000" lot #222 | 2.0 | Do. |
| Polyethylene glycol, Union Carbide Corp., "Carbowax 154" lot #15679360 | 2.0 | Do. |

TABLE IV—Continued

| Additive | Level, percent | Development time (min.) |
|---|---|---|
| Polyethylene glycl, Union Carbide Corp., "Carbowax 400" lot #15683124 | 2.0 | Did not develop. |
| Polyethylene glycol, Union Carbide Corp., "Carbowax 200" lot #15683968 | 2.0 | Do. |
| Polypropylene glycol, Union Carbide Corp., "Niax 150" lot #5145146 | 2.0 | Do. |
| Polypropylene glycol, Union Carbide Corp., "Nisx 425" lot #5129592 | 2.0 | Do. |
| Polypropylene glycol, Union Carbide Corp., "Niax 1025" lot #5142584 | 2.0 | 28. |
| Polypropylene glycol, Union Carbide Corp., "Niax 2025" lot #5143480 | 2.0 | 20. |
| Polyoxyethylene-polyoxypropylene block copolymer, Wyandotte Chemicals Corp., "Pluronic F 38" lot #D-50049-A | 2.0 | Did not develop. |
| Polyoxyethylene-polyoxypropylene block copolymer, Wyandotte Chemicals Corp., "Pluronic L 35" lot #OPIR-236-C | 2.0 | Do. |
| Polyoxyethylene-prolyoxypropylene block copolymer, Wyandotte Chemicals Corp., "Pluronic L 31" lot #D-50171-C | 2.0 | 46. |
| Polyoxyethylene-polyoxypropylene block copolymer, Wyandotte Chemicals Corp., "Pluronic F 77" lot #OPNR-283-E | 2.0 | Did not develop. |
| Polyoxyethylene-polyoxypropylene block copolymer, Wyflindotte Chemicals Corp., "Pluronic F 103" lot #OPIR-178-D (alpha hydro-omega-hydroxy poly [oxytehylene] poly [oxypropylene] containing about 80% polyoxyethylene and about 20% polyoxypropylene with a total molecular weight of about 16,250). | 2.0 | 48. |
| Polyoxyethylene-polyoxypropylene block copolymer, Wyandotte Chemicals Corp., "Pluronic L 101" lot #OPOR-229-B | 2.0 | 38. |
| Polyoxyethylene-polyoxypropylene block copolymer, Wyandotte Chemicals Corp., "Pluronic F 127" lot #C-20532-A | 2.0 | 44. |
| Polyoxyethylene-polyoxypropylene block copolymer, Wyandotte Chemicals Corp., "Pluronic L 121" lot #C-20520-1 | 2.0 | 36. |

Example X illustrated the classes of compounds which are active agents in the practice of this invention. It is noted from the data for "Starfol D," that the required development time decreased with increasing levels of the agent. A more elaborate comparison between active and inactive agents is detailed in Example XVII below.

EXAMPLE XI (A) The process of Example I(A) was repeated in duplicate fashion using 600 grams of chlorine bleached low protein soft wheat cake flour having on an as is basis 6.34% insoluble protein, a moisture of 11.80%, an ash of 0.290%, and an optimum farinograph mixing time and absorption of 1.25 minutes and 54.8% respectively. The thin batter which initially resulted was manipulated at #10 mixing speed for approximately one-half hour, but did not develop.

(B) The procedure of Example XI(A) was repeated again with the exception that the absorption was reduced to 140%. This time the necessary degree of development was obtained in fifteen minutes at #10 mixing speed. The usual volumes, i.e., 900 ml. of separation water and 900 ml. of rinse water were used to obtain a starch slurry of approximately 9° Bé. containing 16.3 grams of solids per 100 cubic centimeters. The resulting wet gluten isolate was surprisingly strong, elastic, and cohesive considering the type flour from which it was derived. The wet gluten isolate was oven dried at 130° C. to constant weight and found to weigh 43.3 grams, containing 83.6% protein. Thus, the net recovery of protein based upon the insoluble flour proteins was 95.2%.

Example XI(B) demonstrated that the practice of this invention produced a surprisingly strong gluten isolate and high net recovery of protein in a type of flour wihch, traditionally, would not be expected to yield such results.

(C) The control procedure of Example I(B) was repeated in duplicate fashion using 600 grams of the above cake flour at an absorption of 55%. The resulting dough was mixed for two minutes at #3 mixing speed. During the washing operation, it was observed that the gluten break up was quite pronounced and most of the gluten was deposited in the starch slurry as lumps still containing a high percentage of starch. After the washing was completed, it was found that only a small amount of crude wet gluten remained in the bowl, and it appeared to be quite high in the starchy constituents of the flour, being very short and crumbly and possessing little or no elastic and cohesive properties.

Example XI(C) confirmed the results expected in attempting to obtain gluten isolates by conventional methods with the noted cake flour.

(D) The starch slurry resulting from Example XI(C) was sieved through a 60 mesh screen to recover the curds of gluten and as much of the finely dispersed gluten as possible. After oven drying to constant weight at 130° C., it was found that 25.0 grams of crude gluten were recovered from the starch slurry, while only 17.7 grams of crude gluten remained in the bowl. Thus, the combined weight of recovered crude gluten was found to be 42.7 grams, all of the weights being expressed on a moisture free basis. However, protein analysis indicatel this crude gluten to be only 68.7% protein, which would account for only a 77.0% net recovery of the insoluble flour proteins. The starch slurry resulting from this procedure was found to be nearly normal in that it was approximately 4° Bé. and contained 7.5 grams of solids per 100 cubic centimeters. However, analysis of the starch slurry solids indicated a protein content of 6.0%, as opposed to only 2.9% for the starch slurry solids of Example XI(B).

Example XI(D) demonstrated that, for a flour of this type it is, as a practical matter, not possible to separate the protein components of the flour, as gluten, from the starch constituents by the standard dough process.

The advantages of this invention, however, were clearly demonstrated by comparing Examples XI (B), (C) and (D), in that an extraordinary yield of a high protein isolate having enhanced properties of extensibility and cohesion was obtained, not just from an average soft wheat flour (generally considered to have inferior gluten with a limited degree of extensibility and cohesion) but from a soft wheat flour which, further had been chlorine bleached for the purpose of rendering the gluten even less extensible and cohesive.

Thus, by the practice of this invention, flours heretofore considered unsuitable for producing vital gluten become candidates therefor.

EXAMPLE XII (A) The process of Example I(A) was repeated in duplicate fashion using 600 grams of hard spring wheat clear flour, having on an as is basis 15.30% total protein comprised of 13.31% insoluble protein and 1.99% soluble protein, a moisture of 10.70%, an ash of 0.675%, and an optimum farinograph mixing time and absorption of nine minutes and 68.6% respectively.

It was found for this extremely high protein hard wheat flour, that levels of ethoxylated mono-diglyceride as low as 0.25% would lead to the desired degree of development at an absorption of 150%, whereas in the complete absence of an agent of this invention, development would not occur at this absorption. Conversely, at the 2% level of ethoxylated mono-diglyceride it was found that an absorption as high as 170% could be used and still obtain the necessary degree of development required to accomplish the objectives of this invention.

The wet gluten isolate obtained from this flour was observed to possess the same modified physical properties previously noted for the other modified gluten isolates obtained by the methods of this invention. Upon oven drying to constant weight at 130° C., 100.0 grams of product were obtained containing 80.2% protein, representing a net recovery of 100.4% based upon the insoluble flour proteins.

(B) Using 600 grams of the above flour and an absorption of 70%, the control process of Example I(B) was repeated in duplicate fashion. The wet gluten isolate obtained was extremely balky, possessing all of the physical properties of a normal, unmodified gluten. The wet isolate was oven dried to constant weight at 130° C. and found to weigh 112.2 grams containing 71.4% protein representing a net recovery of 100.4% based upon the insoluble flour proteins.

The protein content of both modified and unmodified gluten isolates obtained from this flour by the processes of Example I(A) and Example I(B), respectively, were significantly lower than those of the modified and unmodified wheat gluten isolates obtained from medium to medium high protein flours employing the same respective processes. This was apparently due to the fact that when a very high protein hard spring wheat flour of this type is used, the resulting gluten matrix is so tough that the penetration of the rinse water through it, with the subsequent removal of starch, is significantly retarded.

Thus, everything else being equal, a somewhat larger volume of wash water is required to obtain a gluten isolate possessing an equivalent level of protein on a moisture free basis. It should be noted, however, that by employing the methods of this invention, a gluten isolate possessing a minimum of 80% protein on a moisture free basis was still obtainable while at the same time maintaining a constant volume of only 0.54 gallon of process water per pound of flour processed. So far as the net protein yield is concerned, the standard dough process and the process of this invention achieved a very high and identical result of 100.4% based upon insoluble flour proteins, however, the difference in process water requirements and the relative protein content of the respective gluten isolates constitute a significant improvement over the standard dough process.

EXAMPLE XIII

The process of Example I(A) was repeated in near duplicate fashion with 600 gram portions of each of the previously characterized flours respectively. This time, however, after the initial hydration of the respective flour was complete, the mixer was stopped and the batter left to stand undisturbed for one-half hour. In every case it was found that the degree of gluten development was equivalent to that obtained by continued high speed mixing for a period of approximately ten minutes.

This example constitutes additional evidence that the glutens in these respective high water systems are chemically modified and developed by the agents of this invention, and that the physical mixing serves mainly to expedite development by bringing the constituents of a system into more intimate contact and as a vehicle for garnering the developed gluten strands into a single coherent mass.

EXAMPLE XIV

From two 600 gram portions of the clear flour characterized in Example IV, was isolated a standard control sample of vital wheat gluten in exact accordance with the standard dough process of Example I(B), with the exception that the total volumes of process water were increased by ten percent to approximately 1.2 gallons of water per pound of flour, such that the resulting gluten isolates would more closely approach 80% protein on a moisture free basis.

The resulting wet gluten isolates were freeze dried and found to have a combined weight of 175.5 grams on an as is basis. The combined freeze dried gluten isolates were then ground to a fine powder of between 60 and 70 mesh with a Mikro Pulverizer. Subsequent moisture and protein determinations indicated that the freeze dried powdered product contained 5.05% residual moisture and 75.75% protein. The mass yield and protein content of the combined freeze dried control gluten isolates on a moisture free basis would thus be 166.6 grams and 79.75% respectively, corresponding to a net protein yield of 132.9 grams, representing a net protein recovery of 96.3% based upon insoluble flour proteins.

Following the standard Kodex method for oxyethylene analysis, blank determinations were run on duplicate one gram samples of the freeze dried control gluten isolate, yielding results of 0.79% and 0.77% respectively, for an average apparent oxyethylene blank of 0.78% on a moisture free basis. That is to say, during the hydriodic acid digestion of this untreated control gluten isolate, there are produced volatile products of an unknown nature which are apparently capable of consuming equivalent amounts of bromine and silver ions as those which would be consumed by the ethylene and ethyl iodide produced by the hydriodic acid digestion of an inert material containing 0.78% by weight of oxyethylene. It is to be understood, therefore, that in the subsequent examples, the reported oxyethylene content of the modified gluten isolates is the net oxyethylene content in excess of the apparent 0.78% oxyethylene content determined for this normal control gluten isolate.

For the purpose of farinograph and extensograph studies, a blend of 59.4 grams of the control gluten isolate and 390.6 grams of Huron Starbake wheat starch was made such that the total protein content of the mixture was approximately ten percent on an as is basis. Subsequent Kjeldahl analysis of the blend yielded as a result of 10.50% protein.

The control gluten-starch mixture was then sent to a commercial flour laboratory, was were the pursuant modified gluten-starch mixtures, for farinograph and extensograph evaluations. The results obtained from these evaluations are summarized and displayed, along with those obtained for the subsequent modified gluten-starch mixtures, in Table V.

EXAMPLE XV

From two 600 gram portions of the same clear flour used in Example XIV, was isolated a sample of modified vital wheat gluten in near accordance with the modified dough process of Example IX, wherein 2%, based upon flour weight, of E.M.G.–20 was predissolved in each make up water respectively. However, the total volumes of process water were reduced by 25% to approximately 0.8 gallon of process water per pound of flour, such that the resulting modified gluten isolates would more closely approach 80% protein.

The resulting wet modified gluten isolates were freeze dried and found to have a combined weight of 176.1 grams on an as is basis. The combined freeze dried isolates were then ground in the same manner as the control gluten of Example XIV. Subsequent moisture and protein determinations indicated that the freeze dried powdered product contained 5.36% moisture and 75.75% protein. The mass yield and protein content of the combined freeze dried modified gluten isolates were, thus, on a moisture free basis 166.7 grams and 80.04% respectively, corresponding to a net protein yield of 133.4 grams, representing a net protein recovery of 96.7% based upon insoluble flour proteins.

Duplicate 0.1 gram samples taken from the lot of E.M.G.–20 previously characterized in Example I were analyzed for oxyethylene content using the standard Kodex procedure. The results obtained were 63.124% and 63.127% respectively for an average oxyethylene content of 63.13%.

Duplicate one gram samples of the above freeze dried modified vital wheat gluten were analyzed by the standard Kodex procedure and found to have an average oxyethylene content of 0.868% on a moisture free basis. Dividing this result by the level of oxyethylene previously determined to be present in the E.M.G.–20 (0.6313) results in a figure of 1.38%, which is the percent by weight of E.M.G.–20 associated with this modified gluten sample on a moisture free basis. After a Goldfich fat extraction, it was determined that the oxyethylene content of the modified gluten, on a moisture free basis, was 1.20%. Thus, it appeared that nearly all of the E.M.G.–20 left in association with an 80% protein modified wheat gluten was tightly bound by the protein and not just physically trapped. It should be noted that this result was in good agreement with the result obtained on a gluten isolated from a different flour by the independent, though less refined, analytical method discussed in Example III.

For the purpose of farinograph and extensograph studies, a blend of 59.4 grams of the above modified gluten and 390.6 grams of Huron Starbake wheat starch was made such that the total protein content of the mixture would be approximately ten percent on an as is basis. Subsequent Kjeldahl analysis of the blend yielded a result of 10.30% protein. The results of these evaluations are displayed in Table V.

EXAMPLE XVI

From two 600 gram portions of the same clear flour used in Example XIV, was isolated a sample of modified vital wheat gluten in accordance with this invention per Example I-A.

The resulting wet modified gluten isolates were freeze dried and found to have a combined weight of 178.4 grams on an as is basis. The combined freeze dried modified gluten isolates were then ground in the same manner as the control gluten of Example XIV. Subsequent moisture and protein determinations indicated the freeze dried powdered product contained 5.02% moisture and 76.20% protein. The mass yield and protein content of the combined freeze dried modified gluten isolates on a moisture free basis would thus be 135.9 grams and 80.23% proten respectively, corresponding to a net protein yield of 135.9 grams, representing a net protein recovery of 98.5% based upon insoluble flour proteins.

Duplicate one gram samples of this freeze dried modified wheat gluten were analyzed by the standard Kodex procedure and found to have an average oxyethylene content of 0.914% on a moisture free basis. Thus, the percent by weight of E.M.G.-20 associated with this modified gluten sample on a moisture free basis would be 1.45%.

A portion of the above freeze dried modified gluten isolate was rehydrated and extensively washed by hand with numerous fresh water rinses at 35° C. to remove any unbound E.M.G.-20 (which is water soluble). The washings were continued until the rinse water remained essentially free of turbidity due to suspended starch granules. The rewashed sample of modified gluten was then oven dried to constant weight at 130° C. Subsequent Kjeldahl analysis of the oven dried sample indicated it to be 91.0% protein. The remaining 9% can be accounted for almost entirely in terms of ash, crude fiber, free lipids and bound lipids. Thus, little if any significant amounts of starch remained in the extensively washed gluten sample as a possible source of bound E.M.G.-20. That is to say, any E.M.G.-20 found in association with this sample would have to be bound by the gluten proteins and not by broken starch granules imbedded throughout the gluten matrix.

Duplicate one gram samples of this extensively washed, oven dried modified gluten isolate were analyzed by the standard Kodex procedure and found to contain an average oxyethylene content of 0.778% on a moisture free basis. Thus, the percent by weight of E.M.G.-20 still associated with this extensively washed modified gluten sample would be 1.23%. This result was nearly identical with that obtained after Goldfisch fat extraction of the freeze dried modified gluten isolate of Example XIV. Since Goldfisch fat extraction would remove any unbound E.M.G.-20 and extensive water extraction any unbound E.M.G.-20 as well as essentially all of the remaining starch, the above results indicate that E.M.G.-20 is chemically bound by gluten proteins, the bound E.M.G.-20 constituting in excess of 1% by weight of the modified gluten isolates.

For the purpose of farinograph and extensograph studies, a blend of 59.1 grams of this freeze dried modified wheat gluten and 390.9 grams of Huron Starbake wheat starch was made, such that the total protein content of the mixture would be approximately ten percent on an as is basis. Subsequent Kjeldahl analysis of the blend yielded a result of 10.58% protein. The results of these evaluations are displayed in Table V.

TABLE V.—FARINOGRAPH AND EXTENSOGRAPH DATA FOR CONTROL GLUTEN-STARCH AND MODIFIED GLUTEN-STARCH MIXTURES

| | Farinograph data | | | | Extensograph data | | | | | | | | |
|---|---|---|---|---|---|---|---|---|---|---|---|---|---|
| | | | | | Area (cm.$^2$) after— | | | Peak resistance (B.U.) after— | | | Extensibility (mm.) after— | | |
| Gluten sample plus starch | Protein (percent) | Absorption (percent) | Mixing peak (min.) | Peak consistency (B.U.) | 45 min. | 90 min. | 135 min. | 45 min. | 90 min. | 135 min. | 45 min. | 90 min. | 135 min. |
| Dough process control gluten | 10.50 | 87.2 | 4.5 | 180 | 101.5 | 107 | 90.2 | 970 | 1,000+ | 1,000+ | 89 | 82 | 72 |
| Dough process, 2% E.M.G.-20 modified gluten | 10.30 | 72.8 | 2.5 | 160 | 99.0 | 115.6 | 120 | 510 | 735 | 855 | 150 | 127 | 135 |
| High absorption process, 2% E.M.G.-20 modified gluten | 10.58 | 71.2 | 3.0 | 130 | 72.0 | 108.9 | 88.4 | 555 | 930 | 960 | 111 | 102 | 83 |

The Farinograph data indicates that the modified gluten-starch compositions had significantly higher absorptions than the normal control gluten-starch compositions, on the average a relative absorption greater by 7%. An even more pronounced difference was seen in the optimum mixing requirements, the modified gluten-starch composition requiring, on the average, 39% less mixing time than the normal control gluten-starch composition. It is noted that increased absorption and reduction of mixing requirements are generally considered desirable characteristics.

The Extensograph data, to facilitate comparison and interpretation, is averaged out over total time below:

Modified gluten-starch composition

Extensograph area _____cm.$^2$__ 101
Peak resistance _____B.U__ 758
Extensibility _____mm__ 119

Normal control gluten-starch composition

Extensograph area _____cm.$^2$__ 100
Peak resistance _____B.U__ 1000+
Extensibility _____mm__ 81

The modified gluten-starch compositions were on the average 47% more extensible, while at the same time being at least 32% less resistant to stretching than was the normal control gluten-starch composition. The extensograph areas of the two were essentially the same, being 101 square centimeters and 100 square centimeters respectively. Therefore, since extensograph area is generally interpreted as being related to the strength of the dough, it appeared that the modified gluten-starch compositions had, on the average, greatly enhanced extensibility and working properties, while at the same time retaining the same degree of strength as the unmodified control gluten-starch composition.

EXAMPLE XVII

Using 600 gram portions of the clear flour characterized in Example IV and the procedure detailed in Example I(A), a further series of tests were conducted to distinguish between agents effective and not effective in the practice of this invention.

When appropriate the wet gluten isolate was totally dried to constant weight, weight recorded, and protein determined with the standard Kjeldahl method with this data and the known character of the subject typical flour, protein yield and percent recovery of insoluble flour proteins were calculated. To exhibit the chemical modification of several samples the extracted dry protein rich product was analyzed for oxyalkene content as described previously and reported as oxyethylene percent.

rye mixture by the practice of this invention and the 44% recovery of the rye flour protein is considered sig-

TABLE VI

| Additive | Level used flour basis, percent | Development time (min.) | Totally dry gluten product (gms.) | Protein content (percent) | Protein recovery Gms. | Percent of insoluble | Residual agent, percent |
|---|---|---|---|---|---|---|---|
| Polyethylene glycol, approx. molecular weights 200, 300, 400, 1540, 4000, 6000, and 20,000 | 2 | (¹) | | | | | |
| Polypropylene glycol, approx. 150 mol. wt. and 425 approx. mol. wt. | 2 | (¹) | | | | | |
| Polypropylene glycol, approx. 1000 mol. wt. | 2 | 14 | 85.6 | 71.3 | 61.0 | 88.4 | 1.73 |
| Polypropylene-polyoxypropylene block copolymer Pluronic F 108 | 2 | 24 | 82.9 | 74.7 | 61.9 | 89.7 | 0.69 |
| Pluronic L 121 | 2 | 18 | 84.6 | 83.5 | 70.6 | 102.3 | |
| Pluronic F 38, L-35 F 77 | 2 | (¹) | | | | | |
| Polyoxyethylene (20) sorbitan monostearate (Tween 60) | 2 | 18 | 72.7 | 82.3 | 59.8 | 86.7 | 1.60 |
| Tween 60 | 1 | 21 | 76.2 | 78.6 | 59.9 | 86.8 | |
| Do | 0.5 | 23 | 80.2 | 66.0 | 52.9 | 81.4 | |
| Polyoxyethylene (20) sorbitan tristearate, Atlas Co. Tween 65 | 2 | 13 | 74.2 | 79.1 | 58.7 | 85.1 | |
| Polyoxyethylene (20) sorbitan mono oleate, Atlas Co. Tween 80 | 2 | 12 | 75.9 | 77.9 | 59.1 | 85.7 | |

¹ Did not develop; became thin with time.

The data in Table VI demonstrates that none of the polyethylene glycols are functional in the practice of this invention. Polypropylene glycol having a molecular weight of 1000 was apparently an effective agent, but less than 1000 appeared ineffective, probably due to the lack of hydrophobic character. With regard to the so called pluronic polyols, it was noted that those compounds having a ratio of weight percentage oxyethylene (the hydrophilic part of the molecule) to the molecular weight of the polyoxypropylene nucleus (the hydrophobic part) of greater than about 0.0316 are ineffective. In comparison, pluronic polyols having the above ratio of less than about 0.0316 do cause gluten development to occur and are effective agents. The effectiveness apparently is increased as its ratio decreases. The polyoxyethylene (20) sorbitan fatty acid series detailed all appear to be functional agents.

EXAMPLE XVIII (A) A 600-gram mixture containing 400 grams of the spring clear wheat flour characterized in Example XII, and 200 grams of white rye flour; having as an as is basis 9.1% total protein, 0.5 ash, and a moisture of 12.1%; was processed by the method of Example I(A), using an absorption of 160% and an E.M.G.-20 level of 2%. Optimum gluten development was observed to occur with a 12-minute mix, and upon the addition of the separation water and subsequent washing, 294.3 grams of wet gluten isolate was obtained and oven dried at 130° C. to constant weight, yielding 76.7 grams of dry product containing 79.8% protein. Thus, the yield of protein was 61.2 grams, representing a recovery of 85.7% based upon the insoluble wheat flour proteins and the total rye flour proteins. If it is assumed that 100% (53.2 gm.) of the insoluble wheat flour proteins were recovered, the remaining 8.0 grams recovered protein represent 44% of the total rye flour proteins. Inasmuch as some of the rye flour proteins are water soluble, the actual recovery, based upon the insoluble rye flour proteins, was in excess of 44%.

(B) The process of part (A) of this example was repeated in duplicate, except that none of the agents of this invention were employed. The resulting batter was smooth and homogeneous, gluten development failing to occur. Thus, no yield of isolated gluten was possible.

(C) Upon employing the mixture of wheat flour and rye flour characterized in Example XVIII(A) with the standard dough process of Example I(B) at an absorption of 70%, almost a complete break up of the dough into slimy lumps occurred during mechanical washing of the dough mass, thereby necessitating either hand washing or collection of and washing of the lumps on a screen to facilitate any separation of the gluten. From the standpoint of commercial application such hand washing and screen collection is impractical.

Example XVIII indicates that, surprisingly, an easily washed gluten mass was obtained from the wheat and nificantly greater than that predicted using prior art methods for the recovery thereof.

EXAMPLE XIX (A) A 600 gram mixture containing 400 grams of the spring clear wheat flour characterized in Example XII, and 200 grams of Quaker Q-Bond yellow corn flour, having on an as is basis 8.2% total protein and a moisture of 6.9%, was processed by the method of Example I(A) using 150% absorption and an E.M.G.-20 level of 2%. Optimum gluten development was observed to occur in 20 minutes, and upon addition of the separation water and subsequent washing, 264.5 grams of wet gluten isolate was obtained. The wet isolate was oven dried at 130° C. to constant weight, yielding 80.3 grams of dry product containing 70.7% protein. Thus the yield of protein was 56.8 grams, representing a recovery of 81.6% based upon the insoluble wheat flour proteins and the total corn flour proteins. If it is assumed that 100% of the insoluble wheat flour proteins (53.2 gm.) was recovered, the remaining 3.6 grams of recovered protein would represent 22% of the total corn flour proteins.

(B) Part (A) of this example was repeated using a 600-gram portion of flour containing 50% by weight of the spring clear flour and 50% by weight of the Q-Bond yellow corn flour. The absorption was kept at 150% and the E.M.G.-20 level at 2%. The optimum development time was observed to be 22 minutes. Upon addition of the separation water and subsequent washing, 197.8 grams of wet gluten isolate was obtained. The wet isolate was oven dried at 130° C. to constant weight, yielding 72.0 grams of dry product containing 75.1% protein. Thus, the yield of protein was 54.1 grams, representing an 83.9% recovery based upon the insoluble wheat flour proteins and the total corn flour proteins. If it is assumed that 100% of the insoluble wheat flour proteins (39.9 grams in this case) were recovered, the remaining 10.4 grams of recovered protein would represent a 42% recovery of the total corn flour proteins.

(C) The process of parts (A) and (B) of this example was repeated, with the exception that none of the agents of this invention were employed. The resulting batters did not develop, therefore, no gluten isolates were obtained.

(D) When the flour mixture characterized in part (A) of this example was employed in conjunction with the standard dough process of Example I(B) at an absorption of 70%, serious dough break up occurred during the early stages of mechanical washing. It was, therefore, apparent that mechanical washing of dough of this type, in the absence of an agent of this invention was not feasible.

(E) When the flour mixture characterized in part (B) of this example was employed in conjunction with the standard dough process of Example I(B) at an absorption of 70%, complete break up of the dough mass occurred when mechanical washing was attempted. Therefore, it appeared that in absence of an agent of this invention, no yield of gluten isolate was obtainable from a 50/50 mixture of wheat flour and corn flour.

EXAMPLE XX

A 600 gram portion of the winter wheat clear flour characterized in Example IV was used in conjunction with the process of Example I(A). The agent employed in each case was E.M.G.–20 predissolved in the make up water at a level of 2% based upon flour weight. The effect of mineral content and pH of the make up water on the batter development times and the gluten yield was investigated by varying the make-up water (900 grams in each case) between distilled water, tap water and tap water plus 1% NaCl. The results follow in Table VII.

TABLE VII.—THE EFFECT OF MAKE UP WATER MINERAL CONTENT UPON DEVELOPMENT TIME AND GLUTEN YIELD

| Make up water (900 gm.) | Development time (min.) | Product yield (gm.) M.F.B. | Protein content (percent) M.F.B. | Protein (gm.) | Recovery (M.F.B.) (percent of insoluble) |
|---|---|---|---|---|---|
| Distilled water, pH 6.45–7.8 | 11–12 | 83.8–82.8 | 80.8–80.0 | 67.5–66.2 | 98.7–96.8 |
| Tap water, pH 6.45–7.8 | 10–15 | 82.4–81.5 | 78.5–80.0 | 64.5–65.2 | 94.3–95.3 |
| Tap water plus 1% NaCl pH 7.8 | 30 | 70.5 | 80.1 | 56.2 | 82.2 |

The addition of 1% sodium chloride to the make up water doubled the development time and reduced the recovered flour proteins by 9 grams. This was unexpected since the addition of salt to the make-up water or to the flour to toughen the gluten and improve yields is common practice in many starch-gluten factories. A substantial reduction in development time and a significant increase in protein recovery resulted when distilled water was used in place of tap water. This was also unexpected, as prior art teaches that a reduction in the gluten yield results when soft water is employed. In fact, it is common practice in many starch-gluten factories to employ well water in an effort to obtain hard water. In contrast, with the practice of this invention the use of hard water is not indicated. Apparently, the presence of dissolved minerals in the make-up water (hard water) can have a significant effect on the practice of this invention and optimum results will be achieved by a detailed consideration of the water used with a specific agent.

The tests indicated that pH over a range of 6.45 to 7.80 was nearly insignificant insofar as gluten yield was concerned. However, the lower pH tap water did appear to decrease development time significantly.

Although polyoxyethylene mono-diglyceride is not necessarily the most effective agent for the practice of this invention, it is, nevertheless, one of the preferred agents, since it is an accepted edible material, relatively inexpensive and readily available.

It is to be understood that while certain forms of this invention have been described herein, it is not to be limited thereto except insofar as such limitations are included in the following claims.

What we claim and desire to secure by Letters Patent is:

1. The process of separating constituents of grain flour by water treatment comprising:
preparing a dough with make-up water and flour in the presence of an agent comprising at least one nonionic surfactant of the general formula:

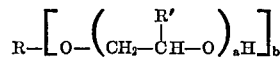

wherein R, R', $a$ and $b$ correspond to one of the following relationships:
R is a fatty acid radical having from about 12 to about 24 carbon atoms, and R' is selected from the group consisting of H and $CH_3$, and $a$ is an integer from about 8 to about 40 and $b$ is 1;
R is a polyoxypropylene group having a molecular weight of at least 900, and R' is H, and $a$ is an averaged integer and $b$ is equal to 2, and the product of $a$ times $b$ is such that the oxyethylene content represents from about 10% to about 80% by weight of the molecule, and the ratio of the weight percent of oxyethylene in the molecule to the molecular weight of the polyoxypropylene nucleus is less than about 0.0316;
R is polypropylene glycol having a molecular weight of at least about 900, and $b$ is zero;
R is a partial fatty acid ester of a polyhydroxy compound wherein the fatty acid radical contains from about 12 to about 24 carbon atoms, and R' is selected from the group consisting of H and $CH_3$, and $a$ is the average number of oxyalkene residues per chain, and $b$ equals the average number of chains in the molecule such that the product of $a$ times $b$ represents on the average an oxyalkene content of from about 8 to about 25 residues per molecule;
the surfactant being present in an amount constituting from about 0.25%, to about 4.0% by weight based on the flour, and exposing said dough to water.

2. The process as set forth in claim 1 wherein said dough is exposed to water during manipulation of said dough.

3. The process as set forth in claim 1 wherein said partial fatty acid ester of a polyhydroxy compound is a partial fatty acid ester of glycerine.

4. The process as set forth in claim 1 wherein said partial fatty acid ester of a polyhydroxy compound is a mono-di-fatty acid ester of glycerine.

5. The process as set forth in claim 1 wherein said partial fatty acid ester of a polyhydroxy compound is a partial fatty acid ester of sorbitol.

6. The process as set forth in claim 1 wherein said make-up water is employed in an amount constituting from about 55% to about 170% based upon flour weight.

7. The process as set forth in claim 1 wherein said make-up water is employed in an amount constituting about 150% based upon flour weight.

8. The process as set forth in claim 1 wherein total water is employed in an amount constituting from about .36 to about 1.1 gallons per pound of flour.

9. The process as set forth in claim 1 wherein total process water is employed in an amount constituting about .54 gallons per pound of flour.

10. The process as set forth in claim 1 wherein said surfactant is contained in said make-up water.

11. The process as set forth in claim 1 wherein said surfactant is combined with said flour.

12. The process as set forth in claim 1 wherein said flour is wheat flour.

13. The process as set forth in claim 1 wherein said flour is hard spring wheat clear flour.

14. The process as set forth in claim 1 wherein said flour is hard winter wheat clear flour.

15. The process as set forth in claim 1 wherein said flour is soft wheat flour.

16. The process as set forth in claim 1 wherein said flour is a mixture of wheat and corn flours.

17. The process as set forth in claim 1 wherein said flour is a mixture of wheat and rye flours.

18. The process as set forth in claim 1 wherein said flour is hard winter wheat clear flour and the surfactant is present in an amount constituting about 2% by weight based upon the flour.

19. Modified gluten produced by the process set forth in claim 1.

20. A process for reducing the volume of water required for separating grain flour into starch and protein concentrates comprising:

the steps of initially hydrating the flour in the presence of from about 0.25% to about 4.0% by weight based on flour of a nonionic surfactant of the formula:

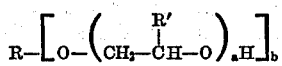

wherein R, R', a and b correspond to one of the following relationships:

R is a fatty acid radical having from about 12 to about 24 carbon atoms, and R' is selected from the group consisting of H and CH$_3$, and a is an integer from about 8 to about 40 and b is 1;

R is a polyoxypropylene group having a molecular weight of at least 900, and R' is H, and a is an averaged integer and b is equal to 2 and the product of a times b is such that the oxyethylene content represents from about 10% to about 80% by weight of the molecule, and the ratio of the weight percent of oxyethylene in the molecule to the molecular weight of the polyoxypropylene nucleus is less than about 0.0316;

R is polypropylene glycol having a molecular weight of at least about 900, and b is zero;

R is a partial fatty acid ester of a polyhydroxy compound wherein the fatty acid radical contains from about 12 to about 24 carbon atoms, and R' is selected from the group consisting of H and CH$_3$, and a is the average number of oxyalkene residues per chain, and b equals the average number of chains in the molecule such that the product of a times b represents on the average an oxyalkene content of from about 8 to about 25 residues per molecule.

21. Vital wheat gluten having bound thereto a minor quantity of a nonionic surfactant, taken from the class consisting of derivatives of the polyethylene and polypropylene glycols, effective to enhance rheological properties thereof.

22. Vital wheat gluten isolates having bound thereto a minor quantity of at least one agent of the formula:

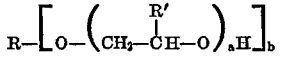

wherein R, R', a and b correspond to one of the following relationships:

R is a fatty acid radical having from about 12 to about 24 carbon atoms, and R' is selected from the group consisting of H and CH$_3$, and a is an integer from about 8 to about 40 and b is 1;

R is a polyoxypropylene group having a molecular weight of at least 900, and R' is H, and a is an averaged integer and b is equal to 2 and the product of a times b is such that the oxyethylene content represents from about 10% to about 80% by weight of the molecule, and the ratio of the weight percent of oxyethylene in the molecule to the molecular weight of the polyoxypropylene nucleus is less than about 0.0316;

R is polypropylene glycol having a molecular weight of at least about 900, and b is zero;

R is a partial fatty acid ester of a polyhydroxy compound wherein the fatty acid radical contains from about 12 to about 24 carbon atoms, and R' is selected from the group consisting of H and CH$_3$, and a is the average number of oxyalkene residues per chain, and b equals the average number of chains in the molecule such that the product of a times b represents on the average an oxyalkene content of from about 8 to about 25 residues per molecule.

23. Vital wheat gluten isolates of at least 40% protein by weight containing a minor portion of bound ethoxylated partial fatty acid esters of glycerine.

24. The gluten isolates of claim 23 wherein said ethoxylated partial fatty acid esters of glycerine are polyoxyethylene (20) mono-diglyceride which is 60–65% ethylene oxide by weight.

25. Vital wheat gluten isolates of at least 40% protein by weight containing a minor portion of bound polyoxyethylene (20) sorbitan monostearate.

26. Vital wheat gluten isolates of at least 40% protein by weight containing a minor portion of bound polypropylene glycol with a molecular weight of about 1000 to 4000.

27. Vital wheat gluten isolates of at least 40% protein by weight containing a minor portion of bound alpha hydro-omega-hydroxy poly (oxyethylene) poly (oxypropylene) block copolymer containing about 80% polyoxyethylene and about 20% polyoxypropylene with a total molecular weight of about 16,250.

28. The process of separating a milled wheat product by water treatment into a hydrated insoluble protein fraction and a starch fraction comprising:

(a) preparing a mixture with water and said wheat product in the presence of polypropylene glycol having a molecular weight of about 1000 to 4000, (b) said polypropylene glycol being present in said mixture in an amount constituting from about 0.25% to about 4.0% by weight based on said wheat product, said water being present in an amount constituting from about 55% to about 170% based on said wheat product, and (c) exposing said mixture to water.

29. The process of separating a milled wheat product by water treatment into a hydrated insoluble protein fraction and a starch fraction comprising:

(a) preparing a mixture with water and said wheat product in the presence of alpha hydro-omega hydroxy poly (oxyethylene) poly (oxypropylene) block copolymer containing about 80% polyoxyethylene and 20% polyoxypropylene with a total molecular weight of about 16,250, (b) said copolymer being present in said mixture in an amount constituting from about 0.25% to about 4.0% by weight based on said wheat product, said water being present in an amount constituting from about 55% to about 170% based on said wheat product, and (c) exposing said mixture to water.

30. The process of separating a milled wheat product by water treatment into a hydrated insoluble protein fraction and a starch fraction comprising:

(a) preparing a mixture with water and said wheat product in the presence of polyoxyethylene (20) sorbitan monostearate which meets the following specifications:

| | |
|---|---|
| Saponification number | 45–55 |
| Acid number | 0–2 |
| Hydroxyl number | 81–96 |
| Oxyethylene content percent | 65–69.5 |

(b) said polyoxyethylene (20) sorbitan monostearate being present in said mixture in an amount constituting from about 0.25% to about 4.0% by weight based on said wheat product, said water being present in an amount constituting from about 55% to about 170% based on said wheat product, and (c) exposing said mixture to water.

31. The process of separating a milled wheat product by water treatment into a hydrated insoluble protein fraction and a starch fraction comprising:

(a) preparing a mixture with water and said wheat product in the presence of polyoxyethylene (20) mono- and diglycerides of edible fatty acids primarily composed of stearic, palmitic and myristic fatty acids and meeting the following specifications:

| | |
|---|---|
| Saponification number | 65–75 |
| Acid number | 0–2 |
| Hydroxyl number | 65–80 |
| Oxyethylene content _____percent | 60.5–65.0 |

(b) said glycerides being present in said mixture in an amount constituting from about 0.25% to about 4.0% by weight based on said wheat product, said water being present in an amount constituting from about 55% to about 170% based on said wheat product, and (c) exposing said mixture to water.

References Cited

UNITED STATES PATENTS

| | | | |
|---|---|---|---|
| 2,555,908 | 6/1951 | Edeskuty | 127—67 X |
| 2,516,117 | 7/1950 | Harrel | 127—67 |
| 3,463,770 | 8/1969 | Fellers | 127—67 X |
| 3,493,384 | 2/1970 | Fellers | 127—67 X |
| 3,574,180 | 4/1971 | Johnston | 127—67 |
| 3,575,710 | 4/1971 | Plaven | 127—67 |
| 3,669,739 | 6/1972 | Plaven | 127—67 X |
| 3,362,829 | 1/1968 | Landfried | 260—112 G |

OTHER REFERENCES

Chemical Abstracts 53:22561i (1959).
Chemical Abstracts 55:11700c (1961).
"Soybeans and Soybean Products," K. S. Markley, ed., vol. I, 174–176, Interscience, New York, 1950.
D. K. Mecham et al., Cereal Chem., 29(6), 448 (1952).

MORRIS O. WOLK, Primary Examiner
S. MARANTZ, Assistant Examiner

U.S. Cl. X.R.
127—67, 69, 70

UNITED STATES PATENT OFFICE
CERTIFICATE OF CORRECTION

Patent No. 3,783,139　　　　　　　　Dated January 1, 1974

Inventor(s) John R. Moneymaker et al.

It is certified that error appears in the above-identified patent and that said Letters Patent are hereby corrected as shown below:

Column 1, line 45, "40° Be'" should read -- 4.0° Be' --.

Column 9, line 11, "usuall" should read -- usual --.

Column 11, Table IV, first line, "glycl" should read -- glycol --.

Column 11, Table IV, line 4, "nisx" should read -- Niax --.

Column 14, line 19, "yielded as a result" should read -- yielded a result --.

Column 14, line 22, "was" should read -- as --.

Column 15, Table V, in the first line for "Dough process control gluten" "87.2" under the Absorption column, should read -- 67.2 --.

Column 3, line 29, "solid" should read -- solids --

Column 6, lines 5 through 13, the paragraph beginning "The" and ending "proteins" should be deleted.

UNITED STATES PATENT OFFICE
CERTIFICATE OF CORRECTION

Patent No. 3,783,139      Dated January 1, 1974

Inventor(s) John R. Moneymaker et al.

It is certified that error appears in the above-identified patent and that said Letters Patent are hereby corrected as shown below:

Column 6, line 52, "gluten were" should read -- gluten was --.

Column 7, line 7, "gluten were" should read -- gluten was --.

Column 14, line 67, "oxyethylene" should read -- E.M.G.-20 --.

Signed and sealed this 3rd day of September 1974.

(SEAL)
Attest:

McCOY M. GIBSON, JR.
Attesting Officer

C. MARSHALL DANN
Commissioner of Patents